United States Patent
Myer et al.

(10) Patent No.: US 9,089,791 B2
(45) Date of Patent: Jul. 28, 2015

(54) APPARATUS, METHOD, AND SYSTEM FOR REDUCTANT FILTRATION

(71) Applicant: Cummins IP, Inc., Minneapolis, MN (US)

(72) Inventors: Andrew Myer, Greenwood, IN (US); John Heichelbech, Columbus, IN (US); George Muntean, Richland, WA (US); Stephen Holl, Columbus, IN (US); Jim Burke, Columbus, IN (US); John Anthis, Columbus, IN (US)

(73) Assignee: CUMMINS IP, INC., Minneapolis, MN (US)

( * ) Notice: Subject to any disclaimer, the term of this patent is extended or adjusted under 35 U.S.C. 154(b) by 56 days.

(21) Appl. No.: 13/803,827

(22) Filed: Mar. 14, 2013

(65) Prior Publication Data

US 2014/0260206 A1  Sep. 18, 2014

(51) Int. Cl.
*F01N 3/00* (2006.01)
*F01N 3/10* (2006.01)
*B01D 19/00* (2006.01)
*F01N 3/20* (2006.01)
*F01N 3/08* (2006.01)

(52) U.S. Cl.
CPC .............. *B01D 19/0031* (2013.01); *F01N 3/08* (2013.01); *F01N 3/2066* (2013.01); *F01N 2610/02* (2013.01); *F01N 2610/1426* (2013.01); *F01N 2610/1466* (2013.01); *Y02T 10/24* (2013.01)

(58) Field of Classification Search
CPC .............. F01N 3/2066; F01N 2610/02; F01N 2610/03; F01N 2610/1406; F01N 2610/1413; F01N 2610/1426; F01N 2610/1466; F01N 2900/1814

USPC ............................ 60/274, 286, 295, 301, 303
See application file for complete search history.

(56) References Cited

U.S. PATENT DOCUMENTS

| 4,556,490 | A | * | 12/1985 | Kemmner et al. ............ 210/349 |
| 5,413,711 | A |   | 5/1995 | Janik |
| 5,489,384 | A |   | 2/1996 | Janik et al. |
| 5,525,225 | A |   | 6/1996 | Janik et al. |
| 5,584,988 | A | * | 12/1996 | Hashimoto et al. ........... 210/136 |
| 6,946,071 | B2 |   | 9/2005 | Ehara et al. |
| 7,147,110 | B2 |   | 12/2006 | Clausen et al. |
| 2008/0245058 | A1 | * | 10/2008 | Boddy et al. ..................... 60/286 |
| 2009/0301067 | A1 | * | 12/2009 | Dingle et al. .................... 60/286 |
| 2010/0043399 | A1 | * | 2/2010 | Stroia et al. ..................... 60/274 |

(Continued)

FOREIGN PATENT DOCUMENTS

| DE | 1020100 63 207 | 6/2012 | |
| DE | 102010063207 A1 | * 6/2012 | ............... F01N 3/10 |
| EP | 2 556 870 | 2/2013 | |

*Primary Examiner* — Audrey K Bradley
(74) *Attorney, Agent, or Firm* — Foley & Lardner LLP

(57) ABSTRACT

An exhaust gas treatment system for an internal combustion engine may have a reductant delivery system with a reductant tank. A filter module positioned in the reductant tank filters reductant before it is conveyed to the reductant pump to remove impurities. In order to reduce gas flow to the pump, the filter module may have an outlet port leading to the reductant pump and a venting port positioned above the outlet port such that gas bubbles float to the venting port prior to entry of the reductant into the outlet port. The filter module may be secured to a tank level sensor assembly, and may vent the gas to a gas reservoir above the reductant in the reductant tank. Such a filtration system may operate independently of any return line that conveys reductant back to the reductant tank.

20 Claims, 4 Drawing Sheets

(56) References Cited

U.S. PATENT DOCUMENTS

| | | | |
|---|---|---|---|
| 2010/0212290 A1* | 8/2010 | Thiagarajan et al. | 60/274 |
| 2011/0174704 A1* | 7/2011 | Yamada et al. | 210/137 |
| 2012/0144808 A1 | 6/2012 | Fuchs et al. | |
| 2013/0000760 A1 | 1/2013 | Crary | |
| 2013/0233850 A1* | 9/2013 | Treudt | 220/4.14 |

* cited by examiner

APPARATUS, METHOD, AND SYSTEM FOR REDUCTANT FILTRATION

FIELD

This disclosure relates to internal combustion engines, and more particularly to filtration for a reductant delivery system for exhaust gas aftertreatment.

BACKGROUND

Emissions regulations for internal combustion engines have become more stringent over recent years. Environmental concerns have motivated the implementation of stricter emission requirements for internal combustion engines throughout much of the world. Governmental agencies, such as the Environmental Protection Agency (EPA) in the United States, carefully monitor the emission quality of engines and set acceptable emission standards, to which all engines must comply. Consequently, the use of exhaust aftertreatment systems on engines to reduce emissions is increasing.

Generally, emission requirements vary according to engine type. Emission tests for compression-ignition (e.g., diesel) engines typically monitor the release of carbon monoxide (CO), unburned hydrocarbons (UHC), diesel particulate matter (PM) such as ash and soot, and nitrogen oxides ($NO_x$).

With regard to reducing $NO_x$ emissions, $NO_x$ reduction catalysts, including selective catalytic reduction (SCR) systems, are utilized to convert $NO_x$ (NO and $NO_2$ in some fraction) to $N_2$ and other compounds. SCR systems utilize a reductant, typically ammonia, to reduce the $NO_x$. Currently available SCR systems can produce high $NO_x$ conversion rates allowing the combustion technologies to focus on power and efficiency. However, currently available SCR systems also suffer from a few drawbacks.

SCR systems utilize a reductant delivery system to introduce ammonia reductant into the exhaust stream upstream of the SCR catalyst. When just the proper amount of ammonia is available at the SCR catalyst under the proper conditions, the ammonia is utilized to reduce $NO_x$. However, if the reduction reaction rate is too slow, or if a deficient amount of reductant is introduced into the exhaust stream upstream of the SCR catalyst, the SCR system may be unable to convert enough $NO_x$ to meet regulated emission standards associated with $NO_x$.

The reductant delivery system may under-deliver the needed amount of reductant or ammonia due to malfunction of the reductant pump. The reductant pump may be designed for liquid reductant, and therefore may require a priming cycle to purge gas from the pump prior to operation. In the event that entrained gas is delivered to the pump, such gas may cause a "loss of prime" event in which the reductant pump is unable to deliver reductant until the gas can again be purged from the reductant pump. This can interrupt performance of the SCR system, and may require re-initialization of the pump.

This problem may be exacerbated when a higher degree of reductant filtration is used. Many reductant filtration systems tend to cause entrainment of gas into the reductant stream. Thus, existing filtration systems are, in many cases, contributing to pump failure.

SUMMARY

The subject matter of the present application has been developed in response to the present state of the art, and in particular, in response to the problems and needs in the art that have not yet been fully solved by currently available exhaust aftertreatment systems. Accordingly, the subject matter of the present application has been developed to provide apparatus, methods, and systems for filtering reductant for reductant delivery systems that overcome at least some shortcomings of the prior art aftertreatment systems.

A reductant filter for a reductant delivery system may have a housing, a filter medium within the housing, and a reductant inlet port in reductant providing communication with the filter medium. The inlet port may be positioned to draw reductant from a reductant source in which the housing is at least partially immersed. The reductant filter may also have a reductant outlet port in reductant receiving communication with the filter medium, and a gas venting port in gas receiving communication with the filter medium. The gas venting portion may be positioned proximate a top of the filter medium.

In the foregoing reductant filter, the inlet port may be positioned proximate a bottom of the first filter medium. The venting port may be positioned higher than the outlet port and at a vertical offset relative to the outlet port. The vertical offset may be selected to urge entrained gases within the filter module to move to the venting port instead of the outlet port.

In the foregoing reductant filter, the filter module may have a height of at least 50 mm.

In the foregoing reductant filter, the venting port may be horizontally offset from the outlet port.

In the foregoing reductant filter, the filter medium may be positioned between the venting port and the outlet port.

The foregoing reductant filter may further have a housing; the filter medium may be contained within a frame that cooperates with the filter medium to define a cartridge that can be withdrawn through the inlet port for replacement.

In the foregoing reductant filter, the filter medium may be a first filter medium. The reductant filter may further have a second filter medium nested within an interior space of the first filter medium to define a filtered reductant space between the first and second filter media. The second filter medium may have an interior space in fluid communication with the inlet port. The venting port and the outlet port may both be positioned in fluid communication with the filtered reductant space.

An internal combustion engine system of the invention may have a reductant delivery system in reductant supplying communication with combustion exhaust. The reductant delivery system may have a reductant tank containing reductant, a doser that supplies reductant to the combustion exhaust, a reductant pump that draws reductant from the reductant tank and delivers the reductant to the doser, and a filter module positioned within the reductant tank to filter the reductant. The filter module may have a venting port positioned to release entrained gas from the filter module to restrict entry of entrained gas into the reductant pump.

The foregoing internal combustion engine system may further have an internal combustion engine that produces the combustion exhaust.

The foregoing internal combustion engine system may further have an exhaust aftertreatment system in combustion exhaust receiving communication with the internal combustion engine.

In the foregoing internal combustion engine system, the filter module may further have a housing having a top end and a bottom end, and an outlet port in fluid communication with the reductant pump to convey the reductant to the reductant pump after filtration by the filter module. The reductant delivery system may further have a reductant supply line that conveys the reductant from the outlet port to the reductant pump. The venting port may be formed in the top end and the reductant supply line may extend through the top end and into the housing to define the outlet port proximate the bottom end.

The foregoing internal combustion engine system may have a venting line. The filter module may be positioned adjacent to a bottom wall of the reductant tank and the venting line may extend substantially vertically to convey the gas from the venting port through the reductant in the reductant tank to a gas reservoir above the reductant within the reductant tank.

The foregoing internal combustion engine system may have a tank level sensor assembly positioned at least partially within the reductant tank to measure a reductant level within the reductant tank. The filter module may be secured to the tank level sensor assembly.

In the foregoing internal combustion engine system, the filter module may further have an outlet port in fluid communication with the reductant pump to convey the reductant to the reductant pump after filtration by the filter module. The filter module may have a first filter positioned between the venting port and the outlet port.

In the foregoing internal combustion engine system, the reductant delivery system may function independently of any line acting to convey reductant back to the reductant tank from any position downstream of the reductant pump.

According to one method for filtering reductant in a reductant delivery system, the method may include storing the reductant in a reductant tank, filtering the reductant with a first filter of a filter module to provide filtered reductant, venting entrained gas from the filtered reductant to provide filtered, degasified reductant, and drawing the filtered, degasified reductant into a reductant pump. Venting the entrained gas from the filtered reductant may be carried out without removing the entrained gas from the reductant tank.

In the foregoing method, the filter module may have a second filter. One of the first and second filters may be nested within the other of the first and second filters to define a filtered reductant space between the first and second filters. Filtering the reductant may include moving the reductant through the first filter into the filtered reductant space.

The foregoing method may include measuring a reductant level within the reductant tank with a tank level sensor assembly positioned at least partially within the reductant tank. The filter module may be secured to the tank level sensor assembly.

In the foregoing method, the reductant tank may contain reductant and a gas reservoir above the reductant. Venting the entrained gas from the filtered reductant may include directing the entrained gas to a venting port of the filter module, through the reductant in the reductant tank, and into the gas reservoir.

In the foregoing method, the venting port may be positioned higher than an outlet port of the filter module. Directing the entrained gas to the venting port may include allowing the entrained gas to float upward to reach the venting port instead of the outlet port.

Reference throughout this specification to features, advantages, or similar language does not imply that all of the features and advantages that may be realized with the subject matter of the present disclosure should be or are in any single embodiment. Rather, language referring to the features and advantages is understood to mean that a specific feature, advantage, or characteristic described in connection with an embodiment is included in at least one embodiment of the present disclosure. Thus, discussion of the features and advantages, and similar language, throughout this specification may, but do not necessarily, refer to the same embodiment.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which.

DETAILED DESCRIPTION

Figure 1:
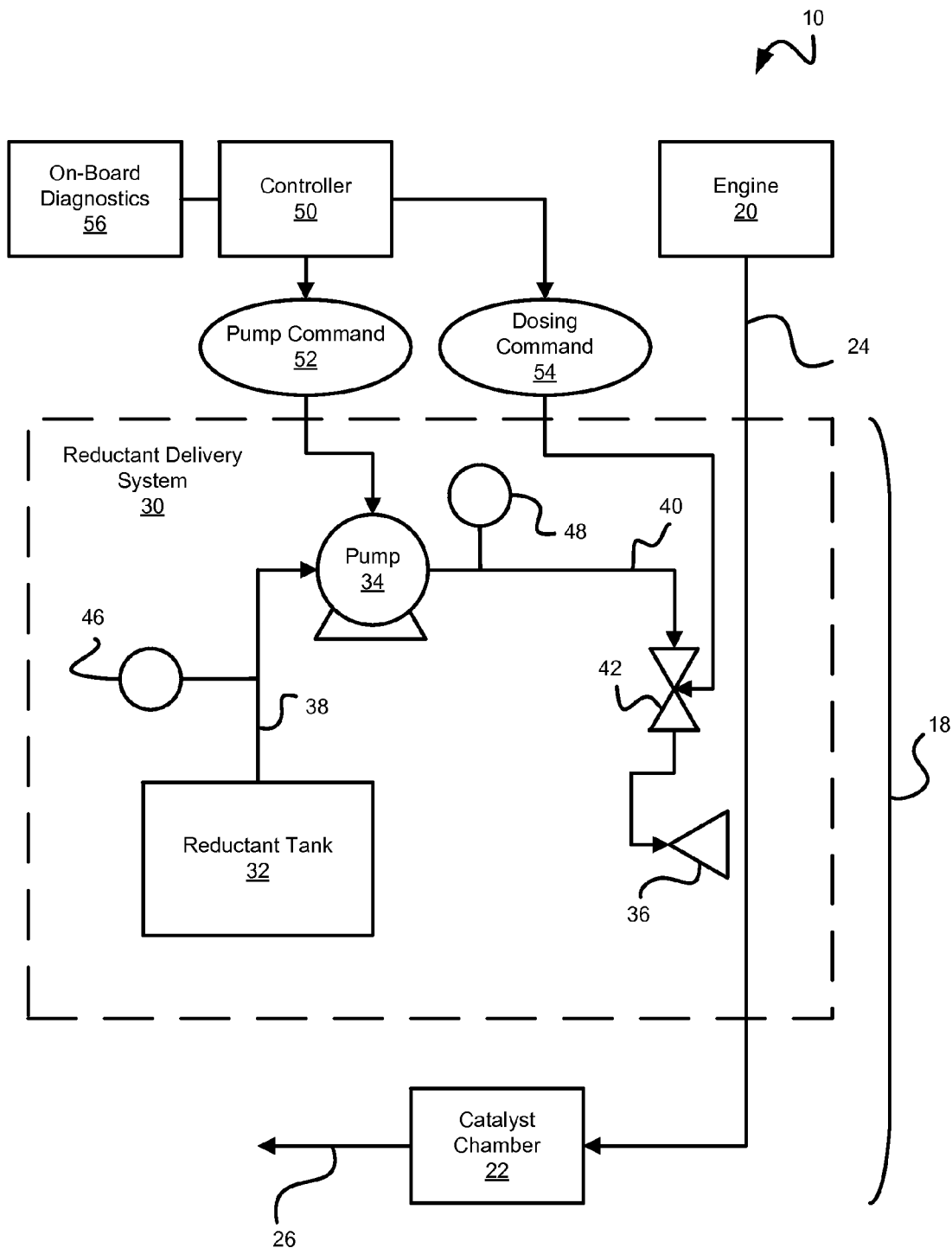
FIG. 1 is a schematic diagram of an engine system having an internal combustion engine and a reductant delivery system in accordance with one representative embodiment.

FIG. 1 depicts one embodiment of an engine system 10. The main components of the engine system 10 include an internal combustion engine 20 and an exhaust gas aftertreatment system, which may take the form of a selective catalytic reduction system or SCR system 18. The SCR system 18 includes a catalyst chamber 22 in exhaust gas receiving communication with the internal combustion engine 20 via an exhaust line 24. The catalyst chamber 22 can include any of various catalysts, such as an SCR catalyst configured to reduce nitrogen-oxides in the presence of a reductant, such as ammonia. The internal combustion engine 20 can be a compression-ignited internal combustion engine, such as a diesel fueled engine, or a spark-ignited internal combustion engine, such as a gasoline fueled engine operated lean. Combustion of the fuel and air in the compression chambers of the internal combustion engine 20 produces exhaust gas that is operatively vented to the exhaust line 24. From the exhaust line 24, at least a portion of the exhaust gas stream flows from into and through the exhaust gas aftertreatment system and SCR system 18 prior to being vented into the atmosphere through a tailpipe 26.

Generally, the SCR system 18 is configured to remove various chemical compounds and particulate emissions present in the exhaust gas received from the exhaust line 24. In addition to the catalyst chamber 22, the SCR system 18 may include a reductant delivery system 30. Additionally or alternatively, the SCR system 18 may include any of various other exhaust treatment components known in the art, such as an oxidation catalyst, a particulate matter filter, and an ammonia oxidation catalyst. The reductant delivery system 30 may include a reductant source, which may take the form of a reductant tank 32, a reductant pump 34, and a doser, which operates as a reductant delivery mechanism and may take the form of an injector 36, but may alternatively be any mechanism that delivers reductant to the exhaust stream. The reductant tank 32 can be a container or tank capable of retaining a reductant, such as, for example, aqueous ammonia ($NH_3$), urea, diesel fuel, diesel exhaust fluid, and diesel oil. The reductant tank 32 is in reductant supplying communication with the reductant pump 34, which is configured to pump reductant from the reductant tank 32 to the injector 36. The injector 36 can be a reductant injector positioned upstream of the catalyst chamber 22. The injector 36 is selectively controllable via actuation of a control valve 42 to inject a desired amount of reductant directly into the exhaust gas stream moving through the exhaust line 24 prior to the exhaust gas entering the catalyst chamber 22.

The reductant delivery system 30 may include reductant lines through which the reductant flows. In the illustrated embodiment, the reductant delivery system 30 includes a reductant supply line 38 that facilitates the flow of reductant from the reductant tank 32 to the injector 36. The reductant pump 34 can be any of various fluid pumps known in the art. According to one embodiment, the reductant pump 34 is a diaphragm pump. The reductant pump 34 draws reductant from the reductant tank 32 at an input pressure and delivers the reductant at an output pressure higher than the inlet pressure. The reductant entering the reductant pump 34 is defined as reductant input flow and the reductant exiting the pump is defined as reductant output flow. The reductant delivery system 30 may include a dosing line 40 downstream of the reductant pump 34. The dosing line 40 may have a length and cross-section geometry selected to allow it to contain sufficient fluid to act as an accumulator. In the alternative, a separate accumulator (not shown) may be provided at any location on the dosing line 40. The dosing line 40 may accumulate and temporarily store a reservoir of reductant output flow at the output pressure. In certain implementations, the dosing line 40 reduces the response time of the supply of pressurized reductant to the injector 36. The dosing line 40 may provide other benefits, such as energy conservation, absorption of hydraulic line shock, pressure holding, compensation for fluid leakage and thermal expansion/contraction, and the like. The reductant delivery system 30 may also include one or more pressure sensors 46, 48 that detect the pressure of the reductant within the system. In some implementations, the reductant delivery system 30 includes only the high pressure sensor 48 downstream of the reductant pump 34, and in others, the system also includes the low pressure sensor 46 upstream of the reductant pump 34.

Figure 2:
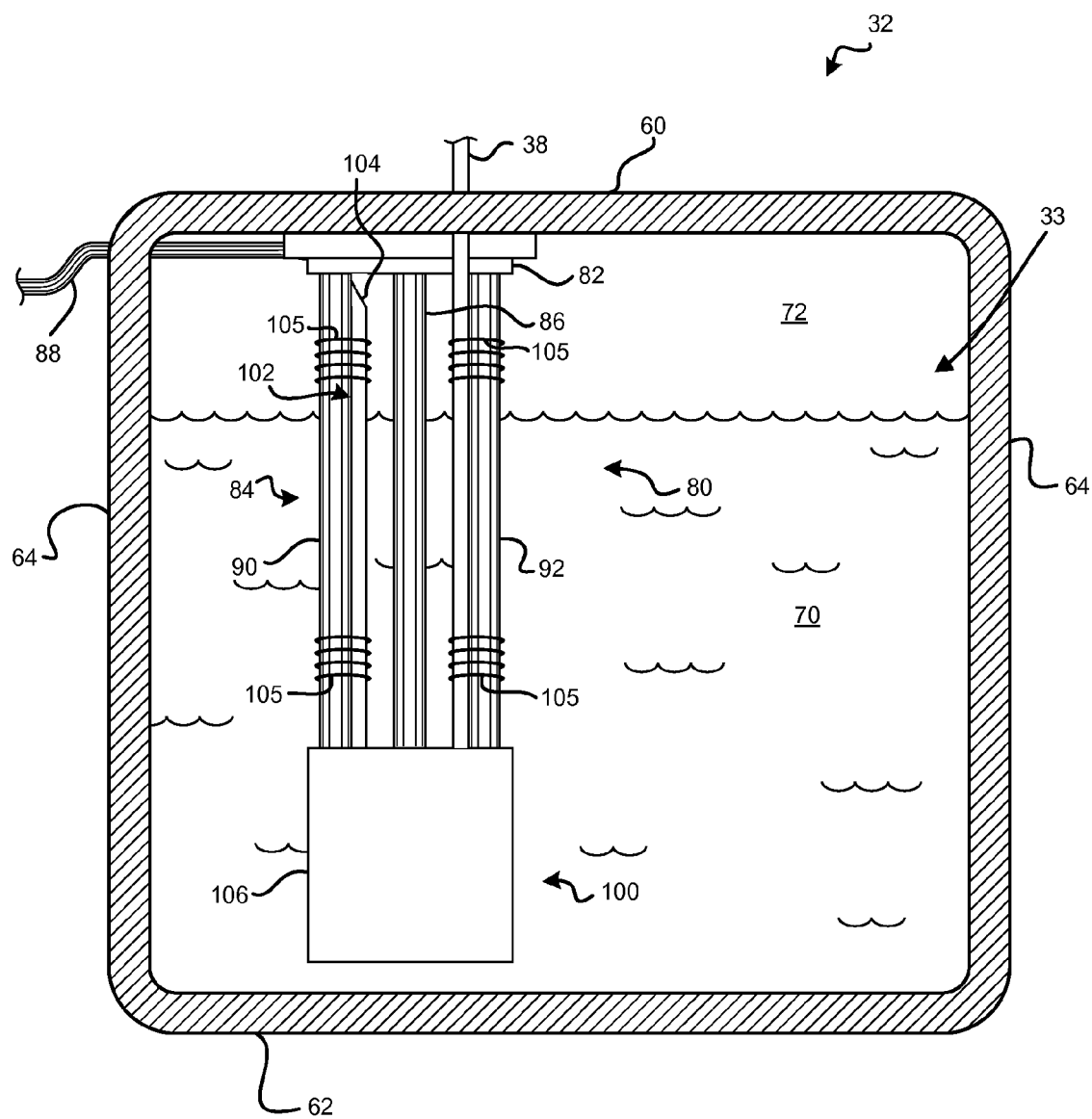
FIG. 2 is a side elevation, section view of the reductant tank of the embodiment of FIG. 1.

The engine system 10 includes a controller 50 that controls the operation of the engine system 10 and associated subsystems, such as the internal combustion engine 20 and the reductant delivery system 30. The controller 50 is depicted in FIGS. 1 and 2 as a single physical unit, but can include two or more physically separated units or components in some embodiments if desired. Generally, the controller 50 receives multiple inputs, processes the inputs, and transmits multiple outputs. The multiple inputs may include sensed measurements from the sensors and various user inputs. The inputs are processed by the controller 50 using various algorithms, stored data, and other inputs to update the stored data and/or generate output values. The generated output values and/or commands are transmitted to other components of the controller 50 and/or to one or more elements of the engine system 10 to control the system to achieve desired results, and more specifically, achieve desired exhaust gas emissions.

Generally, in one embodiment, the controller 50 is configured to control the operation of the control valve 42 to inject a commanded amount of reductant into the exhaust gas stream. The controller 50 can generate the reductant dosing command 54 based on any of various operating conditions and factors as is known in the art. The controller 50 also controls operation of the reductant pump 34 by regulating the speed of the reductant pump 34. In one implementation, the controller 50 generates a pump command 52 associated with a desired pump speed and transmits the pump command to the reductant pump 34. Basically, the desired pump speed associated with the pump command 52 corresponds with a desired output pressure of the reductant output flow.

Desirably, the actual output pressure of the reductant output flow is maintained at the desired output pressure during operation to ensure a proper and accurate injection of reductant through the injector 36. Accordingly, the reductant pump 34 is operated at a speed to maintain the second pressure of the reductant output flow $Q_o$ at or near the desired output pressure. Therefore, based on the pressure detected or sensed by the pressure sensor 48, the controller 50 generates a pump command 52 associated with a pump speed that maintains the actual output pressure at or near the desired output pressure. For example, if the actual output pressure of the reductant output flow sensed by the pressure sensor 48 is below the desired output pressure (or if a pressure differential sensed by the pressure sensors 46, 48 is below a desired pressure differential), then the controller 50 issues a pump command 52 to increase the speed of the reductant pump 34, which results in an increase in the volumetric flow of reductant out of the reductant pump 34, and a corresponding increase in the actual output pressure to meet the desired output pressure. In contrast, if the actual output pressure is above the desired output pressure (or if the pressure differential is above the desired pressure differential), then the controller 50 issues a pump command 52 to decrease the speed of the reductant pump 34 such that the actual output pressure is decreased to meet the desired output pressure. Accordingly, when the system pressure is stabilized, the pump command 52 and pump speed provide a reliable indication of the output flow exiting the reductant pump 34.

The controller 50 may be designed to provide a performance status to an on-board diagnostic system 56, or OBD 56. The OBD 56 may convey the status to a user such as a driver of the vehicle containing the engine system 10, for example, with a light or LED, an auditory signal or alarm, an analog gauge, a digital readout, or the like.

The reductant within the reductant tank 32 may be subject to particulate intrusion, particularly in areas with high pollution or heavy construction. The reductant pump 34, the control valve 42, the injector 36, and/or other components of the reductant delivery system 30 may be sensitive to particulate buildup. Accordingly, filtering the reductant before it reaches the reductant pump 34 may be advisable.

Referring to FIG. 2, a side elevation, section view illustrates the reductant tank 32 of FIG. 1 in greater detail. The reductant tank 32 may have a top wall 60, a bottom wall 62, and four side walls 64. Those of skill in the art will recognize that the rectangular shape illustrated in FIG. 2 is merely exemplary of one embodiment. In other embodiments, a reductant tank may have any known shape. Generally, the reductant tank 32 can be any of various containers, receptacles, or objects capable of storing reductant. The reductant tank 32 is substantially hollow and defines an interior cavity 33 within which a reductant is storable. As shown in FIG. 2, the reductant tank 32 contains a volume of reductant 70. The portion of the interior cavity 33 not occupied by reductant 70 contains a gas or gas reservoir 72 residing above the reductant 70. The gas reservoir 72 may consist of air, and may expand as the reductant 70 is consumed. The reductant tank 32 may be sealed, or may be vented to ambient air if desired to permit more air to enter the gas reservoir 72 as the reductant 70 is consumed.

In the illustrated embodiment, the reductant tank 32 includes a tank level sensor assembly 80 positioned generally within the interior cavity 33 of the reductant tank 32 to measure the level of reductant remaining in the reductant tank 32 and report the same to the OBD 56, the operator, a separate on-board computer, or the like. The tank level sensor assembly 80 may have any configuration known in the art.

As shown in FIG. 2, the tank level sensor assembly 80 includes a base 82, a U-shaped conduit 84, a post 86, and a signal line 88. The signal line 88 may pass through an aperture (not shown) in any of the walls 60, 62, 64 of the reductant tank 32. The aperture may be sealed to prevent the reductant 70 from escaping from the reductant tank 32. The U-shaped conduit 84 may have a first portion 90 and a second portion 92, and may be used for reductant level measurement, or may alternatively provide heating or cooling of the reductant 70 within the reductant tank 32 by circulating warm or cool fluid through the U-shaped conduit 84 to enable heat transfer to or from the surrounding reductant 70. The signal line 88 may provide electrical signals indicative of the level of reductant 70 in the reductant tank 32.

A filter module 100 may be secured to the tank level sensor assembly 80. In alternative embodiments (not shown), a filter module 100 may be free-standing or floating within a reductant tank, secured to a wall of the reductant tank, or secured to any other device within the reductant tank. According to yet other alternative embodiments, the filter module 100 may be positioned outside the reductant tank, and may receive reductant from the reductant tank via a supply line.

Notwithstanding the various embodiments, in the illustrated embodiment of FIG. 2, the filter module 100 is submerged within the reductant 70 of the reductant tank 32 proximate the bottom wall 62. This arrangement provides a number of advantages, including a reduction in the part count (e.g., by eliminating excess fluid lines, mounting assemblies, and the like), reduction of the number of possible clog points in the system, and reduction of the length of the fluid path required to deliver reductant to the injector 36. Reducing the length of the fluid path may make the reductant delivery system 30 more responsive and easier to control than a counterpart system (not shown) with a filter outside the reductant tank. Further, securing the filter module 100 to the tank level sensor assembly 80 provides additional advantages by further reducing hardware and assembly steps required to make the reductant tank 32.

As shown, the filter module 100 is connected to the reductant supply line 38 leading to the reductant pump 34 (shown in FIG. 1). The reductant supply line 38 may pass through an aperture (not shown) in any of the walls 60, 62, 64 of the reductant tank 32. The aperture may be sealed to prevent the reductant 70 from escaping from the reductant tank 32. The filter module 100 may also be connected to a venting line 102 that conveys gas from the interior of the filter module 100 to the gas reservoir 72. The venting line 102 may thus have an opening 104 adjacent to the base 82 or the top wall 60 of the tank 32. The venting line 102 and the reductant supply line 38 may be secured to the first and second portions 90, 92, respectively, of the U-shaped conduit 84 via clips 105 as shown, or by other attachment methods.

The filter module 100 may have a housing 106 that contains the internal components of the filter module. The various components of the filter module 100 will be shown and described in greater detail in connection with FIG. 3.

Figure 3:
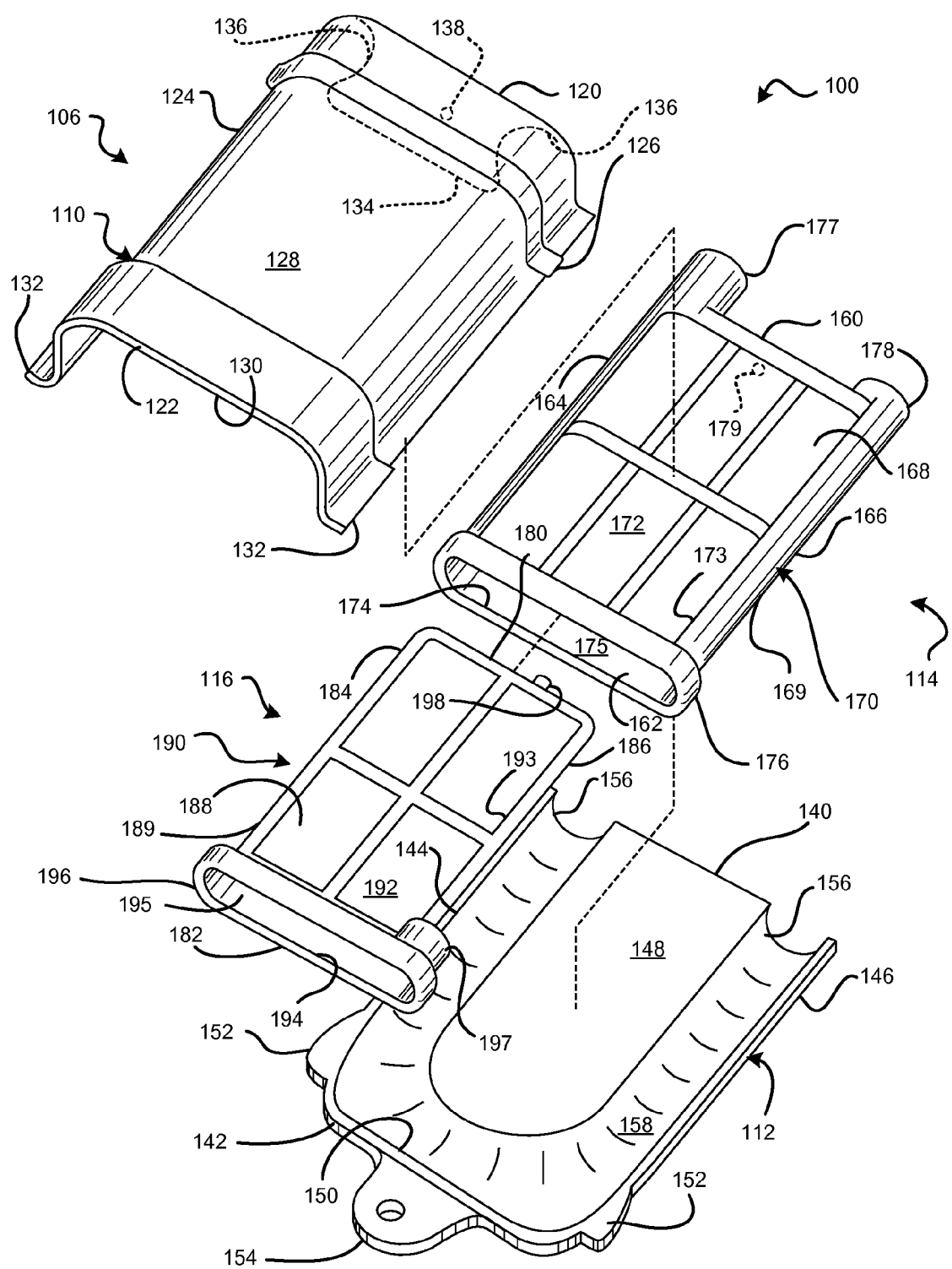
FIG. 3 is a perspective, exploded view of the filter module of the embodiment of FIG. 1.

Referring to FIG. 3, an exploded view illustrates the various components of the filter module 100. As shown, the housing 106 may have a first component 110 and a second component 112. The filter module 100 may also have a first filter 114 and a second filter 116. In addition, various fasteners, clips, or other implements (not shown in FIG. 3) may be used to hold the first and second components 110, 112 of the housing 106 together and/or keep the first and second filters 114, 116 in place within the housing. The filter module 100 may be a "cartridge type" filter. Thus, each or both of the first and second filters 114, 116 may define a discrete package that is easily replaced.

As shown in FIG. 3, the first component 110 of the housing 106 may have a top end 120, a bottom end 122, a first side 124, a second side 126, and a face 128 connecting the top end 120, bottom end 122, and sides 124, 126 together. The bottom end 122 may have an opening 130 sized to permit insertion and/or removal of the filters 114, 116, and a pair of flanges 132 that facilitate assembly of the first component 110 with the second component 112. The top end 120 may have a flange 134 with two openings 136 that permit passage of the lines 38, 102 into the housing 106. The flange 134 may also have a secondary venting aperture 138 that helps prevent gas buildup in the unfiltered reductant within the filter module 100, as will be described subsequently. The sides 124, 126 may be flared to more closely conform to the shape of the end of the conduit 84 of the tank level sensor assembly 80.

The second component 112 of the housing 106 may have a top end 140, a bottom end 142, a first side 144, a second side 146, and a plateau 148, each of which may be adjacent to or in alignment with the corresponding part 120, 122, 124, 126 of the first component 110 when the first and second components 110, 112 are secured together. The bottom end 142 may have an opening 150 and a pair of flanges 152 attachable to the flanges 132 to secure the first and second components 110, 112 together via fasteners (not shown in FIG. 3) or the like. The bottom end 142 may also have a central flange 154 that facilitates attachment of the housing 106 to the tank level sensor assembly 80, for example, by providing attachment of the housing 106 to the post 86.

The top end 140 may have two openings 156 positioned on either side of the plateau 148. The openings 156 may lead into a U-shaped trough 158 shaped to accommodate and capture the U-shaped conduit 84, thereby providing secure mounting of the filter module 100 on the tank level sensor assembly 80. The opening 150 may be sized to leave the end of the U-shaped conduit 84 exposed from the bottom end, thereby also providing a pathway for reductant 70 to enter the first filter 114 from outside the housing 106. The top end 140 of the second component 112 may optionally have one or more additional features (not shown) attachable to the flange 134 or another part of the first component 110 to help secure the components 110, 112 together.

The first filter 114 may have a top end 160, a bottom end 162, a first side 164, a second side 166, a first face 168 (facing upward relative to the viewpoint of FIG. 3), and a second face 169 (facing downward relative to the viewpoint of FIG. 3). The first filter 114 may generally include a frame 170 and a medium 172, which may be any of a wide variety of filter media known in the art. As shown, the medium 172 may be exposed by windows 173 formed in the frame 170. The bottom end 162 may have an opening 174 leading to an interior space 175 within the first filter 114. Windows (not shown) may also exist within the interior space 175 to expose the medium 172 to the interior space 175. Thus, reductant fluid may flow through the medium 172 to pass from the space outside the first filter 114 to the interior space 175.

The opening 174 may be surrounded by a flange 176. The top end 160 may have a first boss 177 that protrudes through one of the openings 136 in the top end 120 of the first component 110 of the housing 106 after assembly of the filter module 100, and a second boss 178 that protrudes through the other opening 136 in the top end 120 of the first component 110 after assembly of the filter module 100. The first and second bosses 177, 178 may receive the venting line 102 and the reductant supply line 38, respectively. The top end 160 may also have a secondary venting aperture 179 that helps prevent gas buildup in the unfiltered reductant within the filter module 100, as will be described subsequently.

The second filter 116 may have a top end 180, a bottom end 182, a first side 184, a second side 186, a first face 188 (facing upward relative to the viewpoint of FIG. 3), and a second face 189 (facing downward relative to the viewpoint of FIG. 3). The second filter 116 may generally include a frame 190 and medium 192. The medium 192 may be exposed by windows 193 formed in the frame 190. Windows (not shown) may also exist within the interior space 195 to expose the medium 192 to the interior space 195. Thus, fluid may flow through the medium 192 to pass from the interior space 175 to the space outside the second filter 116.

The bottom end 182 may have an opening 194 leading to the interior space 195 within the second filter 116. The opening 194 may be surrounded by a flange 196. A boss 197 may protrude from the flange 196 toward the top end 180. The top end 180 may have a boss 198 that protrudes through the secondary venting aperture 179 of the first filter 114 after the first and second filters 114, 116 have been assembled. The boss 198 has a secondary venting aperture 199 (shown in FIG. 4) that permits entrained gas from unfiltered reductant within the interior space 195 to exit the filter module 100 through the secondary venting aperture 138 of the first component 110 of the housing 106. In this application, the phrase "entrained gases" relates to gas that is conveyed with a liquid. Therefore, entrained gas does not require that the gas have any particular chemical association with the liquid bubble size, or other characteristic.

The various components 110, 112, 114, 116 may be assembled to provide the filter module 100. If desired, the housing 106 may be assembled on the conduit 84, for example, by first inserting the bottom portion of the conduit 84 into the trough 158 and optionally, securing the conduit 84 within the trough 158 via crimping, welding, mechanical fastening, adhesives, or the like. The first and second components 110, 112 may then be secured together, for example, by securing the flanges 132 to the flanges 152 and securing the top end 120 to the top end 140, to form the housing 106. The housing 106 is then fully assembled and secured to the tank level sensor assembly 80, and is ready to receive the first filter 114 and the second filter 116.

If desired, the filter module 100 may be a cartridge-style filter module 100. Accordingly, the first filter 114 and/or the second filter 116 may be easily inserted into the housing 106 and/or removed from the housing 106 without the need to detach or disassemble the housing 106. Use of the frames 170, 190 helps facilitate easy replacement because the frames 170, 190 are relatively rigid compared to the media 172, 192, and therefore may slide and/or lock into place within the housing 106 with relative ease.

According to one example, the first filter 114 may first be inserted into the opening 130 of the first component 110 such that the first face 168 is positioned adjacent to the interior of the face 128 of the first component 110 and the second face 169 of the first filter 114 is adjacent to the bottom end of the conduit 84 positioned within the housing 106. The first boss 177 may pass through the corresponding opening 136 in the top end 120 to protrude above the top end 120 of the first component 110. Similarly, the second boss 178 may pass through the corresponding opening 136 in the top end 120 to protrude above the top end 120.

After insertion of the first filter 114 into the first component 110, the secondary venting aperture 179 may be positioned in alignment with the secondary venting aperture 138 of the first component 110. The top end 160 between the first and second bosses 177, 178 may abut the flange 134 of the top end 120, and the flange 176 of the bottom end 162 of the first filter 114 may abut the bottom end 122 of the first component 110 to serve as motion stops to control the resting position of the first filter 114 within the first component 110. Detents, clips, fasteners, or other devices (not shown) may be used to keep the first filter 114 in place within the first component 110.

Then, the second filter 116 may be inserted through the opening 174 and into the interior space 175 of the first filter 114 so that the second filter 116 is nested within the first filter 114. The boss 198 of the top end 180 may extend into the secondary venting aperture 179 to ensure that the boss 198 is in alignment with the secondary venting aperture 179. The flange 196 may abut the flange 176 to serve as a motion stop to control the resting position of the second filter 116 within the first filter 114. Detents, clips, fasteners, or other devices (not shown) may be used to keep the second filter 116 in place within the first filter 114.

In the alternative to the foregoing procedure, the first and second filters 114, 116 may first be assembled together, and then inserted into the first component 110. The first and second filters 114, 116 may be designed for individual replacement, or may be designed to be replaced as a pair. Thus, if desired, a replacement cartridge for the filter module 100 may include both the first filter 114 and the second filter 116. The first and second filters 114, 116 may be pre-assembled prior to delivery to the consumer to facilitate replacement of the cartridge.

After assembly, a gap may generally exist between the exterior of the second filter 116 and the wall surrounding the interior space 175 of the first filter 114. As mentioned previously, each of the frames 170, 190 is designed to permit fluid to flow between the outside of the filter 114, 116 to the interior space 175, 195 through the corresponding media 172, 192. Generally, the filters 114, 116, in their nested state, are designed such that reductant flows from outside the first filter 114 and from within the interior space 195 of the second filter 116 to the space between the first and second filters 114, 116.

This space may thus define a filtered reductant space in which the reductant has been filtered to remove particulate matter and/or other impurities.

In particular, a gap may exist between the first face 188 of the second filter 116 and the surface within the interior space 175 of the first filter 114 that faces the first face 188, and between the second face 189 of the second filter 116 and the surface within the interior space 175 that faces the second face 189. Also, a large gap may exist between the second side 186 of the second filter 116 and the interior of the second side 166 of the first filter 114 to accommodate the end of the reductant supply line 38 and permit flow of filtered, degasified reductant into the reductant supply line 38, as will be shown in FIG. 4. The first and second filters 114, 116 may advantageously form a seal such that fluid is only able to escape from the interior space 175 via the apertures within the bosses 177, 178 of the first filter 114. The components 110, 112 of the housing 106 need not fit together so as to form a seal.

The components 110, 112 and the filters 114, 116 may be formed of any suitable materials including metals, ceramics, polymers, composites, and other combinations thereof. In one example, the components 110, 112 may be made of metal while the frames 170, 190 are formed of polymers selected to withstand prolonged immersion in the reductant 70.

Figure 4:
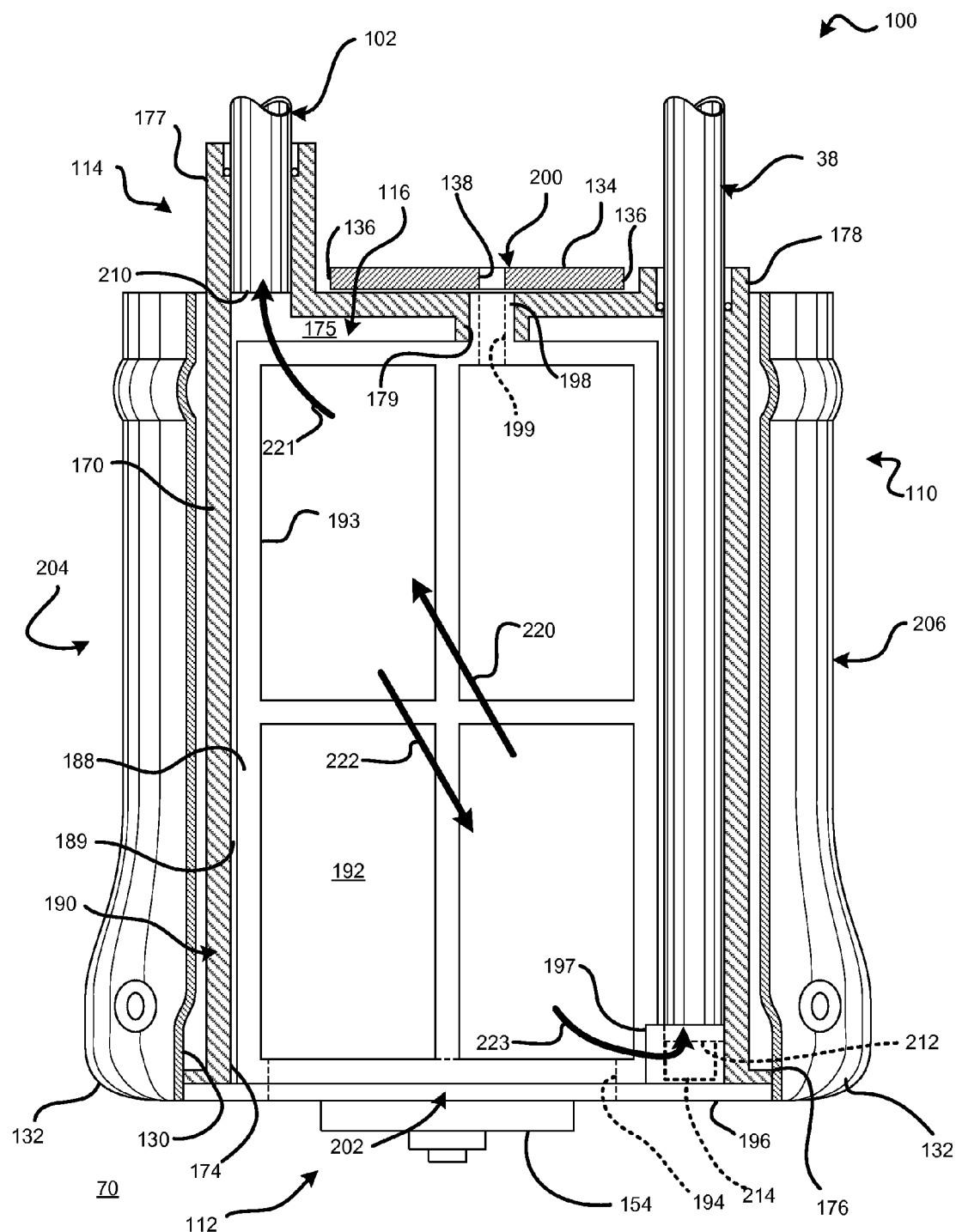
FIG. 4 is a side elevation, partially-sectioned view of the filter module of the embodiment of FIG. 1 in a fully-assembled state.

Referring to FIG. 4, a side elevation, partially-sectioned view illustrates the filter module 100 of FIGS. 2 and 3, with the filter module 100 in the fully assembled state on the tank level sensor assembly 80. As shown, the section plane has been taken through the sides 124, 126 of the first component 110 of the housing 106 and through the center of the first filter 114. The second filter 116, the reductant supply line 38, and the venting line 102 have not been sectioned. The top ends 120, 140, 160, 180 of the various components 110, 112, 114, 116 of FIG. 3 are generally adjacent to each other and are not individually numbered in FIG. 4 for clarity. However, the top ends 120, 140, 160, 180 are collectively represented by reference numeral 200, representing the top end 200 of the filter module 100. Likewise, the bottom ends 122, 142, 162, 182 are collectively represented by the bottom end 202 of the filter module 100, the first sides 124, 144, 164, 184 are collectively represented by the first side 204 of the filter module 100, and the second sides 126, 146, 166, 186 are collectively represented by the second side 206 of the filter module 100.

As shown in FIG. 4, an inlet end of the venting line 102 is secured within the first boss 177 of the first filter 114, and the reductant supply line 38 passes through the second boss 178 of the first filter 114 and is seated within the boss 197 of the second filter 116. The inlet end of the venting line 102 may define a venting port or inlet 210, and the end of the reductant supply line 38 may define a reductant outlet port 212 or inlet to the reductant supply line. The boss 197 may define an interior cavity 214 into which the reductant flows to reach the outlet port 212. The interior cavity 214 may be in fluid communication with the interior space 175 of the first filter 114 via channels or apertures (not shown) that connect the interior cavity 214 to the interior space 175. In the alternative, the interior cavity 214 may be omitted, and the portion of the reductant supply line 38 proximate, but outside of, the boss 197 may have holes (not shown) that receive reductant directly from the interior space 175.

The venting port 210 and the outlet port 212 are in fluid communication with the interior space 175, and therefore in fluid communication with the filtered reductant space defined by the interior space 175 outside of the second filter 116. In this application, "fluid communication" refers to two features within a body of fluid, wherein a continuous and unblocked fluid pathway exists between the two features within the fluid.

The filter module 100 is immersed in reductant 70 within the reductant tank 32. In operation, the reductant 70, which may contain particulates, gas bubbles, and/or other impurities, may be drawn into the filter module 100 through the opening 194 of the second filter 116 and through the opening 150 of the second component 112 of the housing 106. Thus, each of the openings 194, 150 may act as an inlet port by allowing reductant flow into the filter module 100. In this application, a "port" refers to any type of hole in a surface through which fluid is able to pass. A port may have any of a variety of shapes and sizes.

From the opening 194 of the second filter 116, the reductant may flow through the medium 192 of the second filter 116 and may be filtered by the medium 192 so that filtered reductant flows into the interior space 175 within the first filter 114, within which the second filter 116 resides. From the opening 150 of the second component 112, the reductant may flow through the medium 172 of the first filter 114 and may be filtered by the medium 172 so that filtered reductant again flows into the interior space 175. Thus, the interior space 175, outside of the second filter 116, acts as a filtered reductant space in which, generally, only filtered reductant is present.

Any gas bubbles within the unfiltered reductant 70 in the interior space 195 may escape back into the reductant 70 in the reductant tank 32 by passing through the secondary venting aperture 199 of the second filter 116 and through the secondary venting aperture 138 of the housing 106. This may help preserve the ability of the second filter 116 to receive reductant 70 through the corresponding medium 192 by avoiding gas buildup within the interior space 195.

As reductant moves through the media 172, 192, gas bubbles may develop in the reductant. A medium providing a higher filtration (i.e., a tighter mesh or otherwise increased ability to trap smaller particulates) may unfortunately tend to develop more gas bubbles. As mentioned previously, gas inflow into the reductant pump 34 can disrupt the operation of the reductant pump 34. Thus, it is desirable to vent gas from the filtered reductant prior to entry of the filtered reductant into the outlet port 212 as shown by directional arrow 223.

The present invention makes use of the tendency of gases to float to the surface of a liquid. Thus, the venting port 210 is positioned higher than the outlet port 212 in the filter module 100. With further reference to the embodiment of FIG. 4, the venting port 210 may be positioned at or near the highest extent of the interior space 175, and the outlet port 212 may be positioned at or near the lowest extent of the interior space 175. Consequently, gas bubbles within the interior space 175 will tend to float to the venting port 210 before they can be drawn into the outlet port 212.

The vertical offset of the venting port 210 relative to the outlet port 212 provides a significant pressure differential between the venting port 210 and the outlet port 212. This pressure differential may be generally proportional to the propensity of the gas to flow to the venting port 210 rather than the outlet port 212. In the embodiment of FIG. 4, the filter module 100 may have a height of 50 mm or larger. This height helps to ensure that gases 220 (which may be in the form of bubbles) float free of the filtered reductant 70, thus providing filtered, degasified reductant 222 to the outlet port 212. In this application, "degasified" relates to a liquid from which gases have been removed. A "degasified" liquid need not have all gases purged from it, and indeed, it may be acceptable for some gases to remain in the filtered, degasified reductant 222 as it enters the reductant pump 34, particularly if the gases are in the form of small, relatively dispersed bubbles.

The distance the reductant 70 must flow within the interior space 175 before reaching the outlet port 212 may contribute to the degasification process by ensuring the filtered reductant 70 has been in the interior space 175 for long enough for degasification to take place. Thus, the position of the outlet port 212 adjacent to the second side 206 may be advantageous because the windows 193 on the second filter 116 and the windows (not shown) on the interior of the first filter 114 may not provide a direct path of reductant from the interior space 175 to the outlet port 212. Placement of the outlet port 212 in the interior cavity 214 may similarly help ensure that the filtered reductant 70 is sufficiently degasified upon entry into the outlet port 212, particularly if the passages connecting the interior cavity 214 to the interior space 175 are sufficiently small to create flow restrictions that slow the flow of filtered reductant 70 into the interior cavity 214.

Similarly, positioning of the second filter 116, or more precisely the filter medium 192, between the venting port 210 and the outlet port 212 may facilitate degasification due to the fact that the filtered reductant 70 must first flow around the second filter 116 before reaching the outlet port 212. Additionally, positioning the second filter 116 between the venting port 210 and the outlet port 212 helps to keep the filter module 100 compact because the filtered reductant space within the interior space 175 is relatively small. Thus, positioning the second filter 116 between the venting port 210 and the outlet port 212 may enable degasification to occur within a relatively low-volume space prior to fluid entry into the outlet port 212.

Furthermore, the horizontal offset between the venting port 210 and the outlet port 212 may be advantageous in that the gas and the reductant flow in generally opposite directions to reach their respective ports 210, 212. This differential flow gradient, or indeed, potentially opposite flow gradient, may help release gases entrained within the flow of reductant 70. This differential flow gradient is illustrated by the arrows represented by reference numbers 220 and 222, which are shown pointing in opposite directions, toward the venting port 210 and the outlet port 212, respectively.

Yet further, the fact that the first filter 114 (or at least the medium 172) and/or the second filter 116 are positioned generally between the venting port 210 and the outlet port 212 may further be advantageous because filtered reductant emerging into the interior space 175 is immediately subject to this differential flow gradient. This may enhance the probability that entrained gases will be purged from the reductant 70 before the reductant 70 reaches the outlet port 212.

In any case, from the interior space 175, filtered reductant 70 flows to the outlet port 212 as shown by 223, becoming filtered degasified reductant 222 en route. Filtered degasified reductant 70 is drawn into the outlet port 212, through the reductant supply line 38, and to the reductant pump 34. Gases 220 (which may be in the form of bubbles) from the filtered degasified reductant 70 within the interior space 175 flow to the venting port 210 and enter the venting line 102 as shown by direction arrow 221. The gas bubbles travel through the venting line 102 and are released into the gas reservoir 72 through the opening 104 at the top of the venting line 102.

In alternative embodiments, a wide variety of filter modules may be used. For example, a filter module (not shown) need not be designed as a cartridge type filter, but may instead have permanent media, or media that are loose or otherwise replaceable without using a replacement cartridge. A filter module (not shown) need not have multiple filters. Any type of filter may be used, including flat, cylindrical, pleated, or other types.

In other alternative embodiments (not shown), the filter module need not be attached to a tank level sensor assembly, but may instead be secured to an interior wall of the reductant tank, secured to another apparatus within the reductant tank, or the like. Further, the filter module may be positioned outside the reductant tank, and may receive reductant from the tank via a conduit, and may vent gas back into the gas reservoir of the tank via another line that passes into the gas reservoir from outside the reductant tank. In such an embodiment, the filter module may need to be positioned at a height commensurate with the bottom of the reductant tank, or at least sufficiently below the top level of the reductant 70 within the reductant tank to provide significant pressure urging the gas bubbles into the venting port.

Advantageously, the reductant delivery system 30 need not provide a line that connects to the reductant supply line 38 downstream of the reductant pump 34. The venting feature of the filter module 100 may obviate the need for purging gas from the reductant pump 34 and returning the gas to the reductant tank 32. In fact, the placement of the filter module 100 within the reductant tank 32 may enable all gases to be effectively retained within the reductant tank 32. No mechanism need be provided to return gases to the reductant tank 32 because the gases are generally not permitted to exit the reductant tank 32 into other components of the reductant delivery system 30.

In yet other alternative embodiments of the invention, the principles disclosed herein may be applied to venting gas from other liquids. In the context of internal combustion engines, some such liquids are gasoline, diesel fuel, jet engine fuel, engine oil, coolant, brake fluid, power steering fluid, transmission fluid, antifreeze, and the like. The present invention is not limited to use with internal combustion engines, and may be used in any application in which it is desirable to remove gas from a liquid prior to delivery of the liquid to an operative component of the system.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

In the above description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

The present disclosure may be embodied in other specific forms without departing from its spirit or essential characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

What is claimed is:

1. A reductant filter for a reductant delivery system, comprising:
    a housing;
    a filter medium within the housing;
    a reductant inlet port in reductant providing communication with the filter medium, wherein the inlet port is positioned proximate a bottom end of the filter medium to draw reductant from a reductant source in which the housing, including the filter medium, is at least partially immersed;
    a reductant outlet port in reductant receiving communication with the filter medium, the reductant outlet port being positioned proximate the bottom end of the filter medium; and
    a gas venting port in gas receiving communication with the filter medium, the gas venting port being positioned proximate a top end of the filter medium, and the top end of the filter medium being opposite the bottom end of the filter medium,
    wherein the filter medium defines a gas flow path within the housing from the reductant inlet port to the gas venting port.

2. The reductant filter of claim 1, wherein the venting port is positioned higher than the outlet port and at a vertical offset relative to the outlet port, wherein the vertical offset is selected to urge entrained gases within the housing to move to the venting port instead of the outlet port.

3. The reductant filter of claim 1, wherein the housing comprises a height of at least 50 mm.

4. The reductant filter of claim 1, wherein the venting port is horizontally offset from the outlet port.

5. The reductant filter of claim 1, wherein the filter medium is positioned between the venting port and the outlet port.

6. The reductant filter of claim 1, wherein the filter medium is contained within a frame that cooperates with the filter medium to define a cartridge that can be withdrawn through the inlet port for replacement.

7. The reductant filter of claim 1, wherein the filter medium is a first filter medium, and wherein the reductant filter further comprises a second filter medium nested within an interior space of the first filter medium to define a filtered reductant space between the first and second filter media, wherein the second filter medium comprises an interior space in fluid communication with the inlet port, wherein the venting port and the outlet port are both positioned in fluid communication with the filtered reductant space.

8. An internal combustion engine system, comprising:
    a reductant delivery system in reductant supplying communication with combustion exhaust, the reductant delivery system comprising:
        a reductant tank containing reductant;
        a doser that supplies reductant to the combustion exhaust;
        a reductant pump that draws reductant from the reductant tank and delivers the reductant to the doser; and
        a filter module, including a filter medium, positioned within the reductant tank to filter the reductant, the filter module comprising:
            an inlet port positioned proximate a bottom end of the filter module to draw reductant from the reductant tank,
            a venting port positioned proximate a top end of the filter module to release entrained gas from the filter module so as to restrict entry of entrained gas into the reductant pump, the top end of the filter module being opposite the bottom end of the filter module, and the filter medium defining a gas flow path within the filter module from the inlet port to the venting port, and
            an outlet port positioned proximate the bottom end of the filter module, the outlet port in fluid communication with the reductant pump to convey the reductant to the reductant pump after filtration by the filter module.

9. The internal combustion engine system of claim 8, further comprising a venting line; wherein the filter module is positioned adjacent to a bottom wall of the reductant tank and the venting line extends towards a top wall of the reductant tank to convey the gas from the venting port through the reductant in the reductant tank to a gas reservoir above the reductant within the reductant tank.

10. The internal combustion engine system of claim 8, wherein the filter medium is positioned between the venting port and the outlet port.

11. The internal combustion engine system of claim 8, wherein the reductant delivery system further comprises a reductant supply line that conveys the reductant from the outlet port to the reductant pump, wherein the reductant delivery system does not include a line coupled to the reductant supply line downstream of the reductant pump.

12. The internal combustion engine system of claim 8, further comprising an internal combustion engine that produces the combustion exhaust.

13. The internal combustion engine system of claim 12, further comprising an exhaust aftertreatment system in combustion exhaust receiving communication with the internal combustion engine.

14. An internal combustion engine system, comprising:
    a reductant delivery system in reductant supplying communication with combustion exhaust, the reductant delivery system comprising:
        a reductant tank containing reductant;
        a doser that supplies reductant to the combustion exhaust;
        a reductant pump that draws reductant from the reductant tank and delivers the reductant to the doser; and
        a filter module, including a filter medium, positioned within the reductant tank to filter the reductant, the filter module comprising:
            a venting port positioned proximate a top end of the filter module to release entrained gas from the filter module to restrict entry of entrained gas into the reductant pump, and an outlet port positioned proximate a bottom end of the filter module, the outlet port in fluid communication with the reductant pump to convey the reductant to the reductant pump after filtration by the filter module, wherein the reductant delivery system further comprises a reductant supply line that conveys the reductant from the outlet port to the reductant pump the reductant supply line extending through the top end and into the housing to define the outlet port proximate the bottom end.

15. An internal combustion engine system, comprising:
a reductant delivery system in reductant supplying communication with combustion exhaust, the reductant delivery system comprising:
 a reductant tank containing reductant;
 a doser that supplies reductant to the combustion exhaust;
 a reductant pump that draws reductant from the reductant tank and delivers the reductant to the doser;
 a filter module, including a filter medium, positioned within the reductant tank to filter the reductant, the filter module comprising:
  a venting port positioned proximate a top end of the filter module to release entrained gas from the filter module to restrict entry of entrained gas into the reductant pump, and
  an outlet port positioned proximate a bottom end of the filter module, the outlet port in fluid communication with the reductant pump to convey the reductant to the reductant pump after filtration by the filter module; and
 a tank level sensor assembly positioned at least partially within the reductant tank to measure a reductant level within the reductant tank, wherein the filter module is secured to the tank level sensor assembly.

16. A method for filtering reductant in a reductant delivery system, the method comprising:
 storing the reductant in a reductant tank;
 filtering the reductant with a first filter medium of a filter module to provide filtered reductant, the filter module, including the first filter medium, being positioned within the reductant tank;
 venting entrained gas from the filtered reductant to provide filtered, degasified reductant;
 drawing the filtered, degasified reductant into a reductant pump via a reductant supply line fluidly coupled to the filter module via a reductant outlet port of the filter module, the reductant outlet port positioned proximate a bottom end of the filter module; and
 measuring a reductant level within the reductant tank with a tank level sensor assembly positioned at least partially within the reductant tank;
 wherein the filter module is secured to the tank level sensor assembly, and
 wherein venting the entrained gas from the filtered reductant is carried out without removing the entrained gas from the reductant tank.

17. A method for filtering reductant in a reductant delivery system, the method comprising:
 storing the reductant in a reductant tank;
 drawing the reductant into a filter module via a reductant inlet port positioned proximate a bottom end of the filter module;
 filtering the reductant drawn through the reductant inlet port with a first filter medium of the filter module to provide filtered reductant, the filter module, including the first filter medium, being positioned within the reductant tank;
 venting, via a gas venting port positioned proximate a top end of the filter module, entrained gas from the filtered reductant to provide filtered, degasified reductant, and the top end of the filter medium being opposite the bottom end of the filter medium, the entrained gas passing along a gas flow path within the filter module from the reductant inlet port to the gas venting port; and
 drawing the filtered, degasified reductant into a reductant pump via a reductant supply line fluidly coupled to the filter module via a reductant outlet port of the filter module, the reductant outlet port positioned proximate a bottom end of the filter module;
 wherein venting the entrained gas from the filtered reductant is carried out without removing the entrained gas from the reductant tank.

18. The method of claim 17, wherein the filter module comprises a second filter medium, wherein one of the first and second filter media is nested within the other of the first and second filter media to define a filtered reductant space between the first and second filter media, wherein filtering the reductant comprises moving the reductant through the first filter medium into the filtered reductant space.

19. The method of claim 17, wherein the reductant tank contains reductant and a gas reservoir above the reductant; wherein venting the entrained gas from the filtered reductant comprises directing the entrained gas to a venting port of the filter module, through the reductant in the reductant tank, and into the gas reservoir.

20. The method of claim 19, wherein the venting port is positioned higher than an outlet port of the filter module, wherein directing the entrained gas to the venting port comprises allowing the entrained gas to float upward to reach the venting port instead of the outlet port.

* * * * *